(12) United States Patent
Beyer et al.

(10) Patent No.: US 7,044,610 B2
(45) Date of Patent: May 16, 2006

(54) METHOD AND APPARATUS FOR PREVENTING DEBRIS CONTAMINATION OF OPTICAL ELEMENTS USED FOR IMAGING

(75) Inventors: Vincent Charles Beyer, Vancouver (CA); David Bruce Burgess, Vancouver (CA); Marc Aaron Trudeau, Abingdon (GB); Andrew Leroy Dobric, North Vancouver (CA)

(73) Assignee: Kodak Graphic Communications Canada Company, Burnaby (CA)

( * ) Notice: Subject to any disclaimer, the term of this patent is extended or adjusted under 35 U.S.C. 154(b) by 186 days.

(21) Appl. No.: 10/360,929

(22) Filed: Feb. 10, 2003

(65) Prior Publication Data
US 2003/0197909 A1   Oct. 23, 2003

Related U.S. Application Data

(60) Provisional application No. 60/354,516, filed on Feb. 8, 2002.

(51) Int. Cl.
*B41J 2/435* (2006.01)
(52) U.S. Cl. ......................... 359/509; 347/22

(58) Field of Classification Search ................ 359/507, 359/509; 347/22, 34
See application file for complete search history.

(56) References Cited

U.S. PATENT DOCUMENTS

| | | | | |
|---|---|---|---|---|
| 3,584,509 A | * | 6/1971 | Compton et al. | 374/123 |
| 4,277,131 A | * | 7/1981 | Hart et al. | 359/509 |
| 4,658,113 A | * | 4/1987 | Vingerling | 219/147 |
| 4,687,892 A | * | 8/1987 | Brolin et al. | 219/611 |
| 4,784,481 A | * | 11/1988 | Wuerfel | 359/391 |
| 5,359,176 A | * | 10/1994 | Balliet et al. | 219/121.84 |
| 5,359,907 A | * | 11/1994 | Baker et al. | 73/865.5 |
| 5,590,537 A | * | 1/1997 | Vogel | 62/51.1 |
| 6,496,257 B1 | * | 12/2002 | Taniguchi et al. | 356/239.2 |
| 2003/0142403 A1 | * | 7/2003 | Kalley et al. | 359/509 |

* cited by examiner

*Primary Examiner*—Mark A. Robinson
(74) *Attorney, Agent, or Firm*—Oyen Wiggs Green & Mutala LLP

(57) ABSTRACT

The imaging debris produced by imaging a media with a higher power laser is prevented from accumulating on an optical imaging element by establishing a substantially non-turbulent fluid flow across the optical element. The non-turbulent flow forms a barrier between the optical element and the imaging environment such that debris is not able to reach a surface of the optical element during an imaging operation.

15 Claims, 5 Drawing Sheets

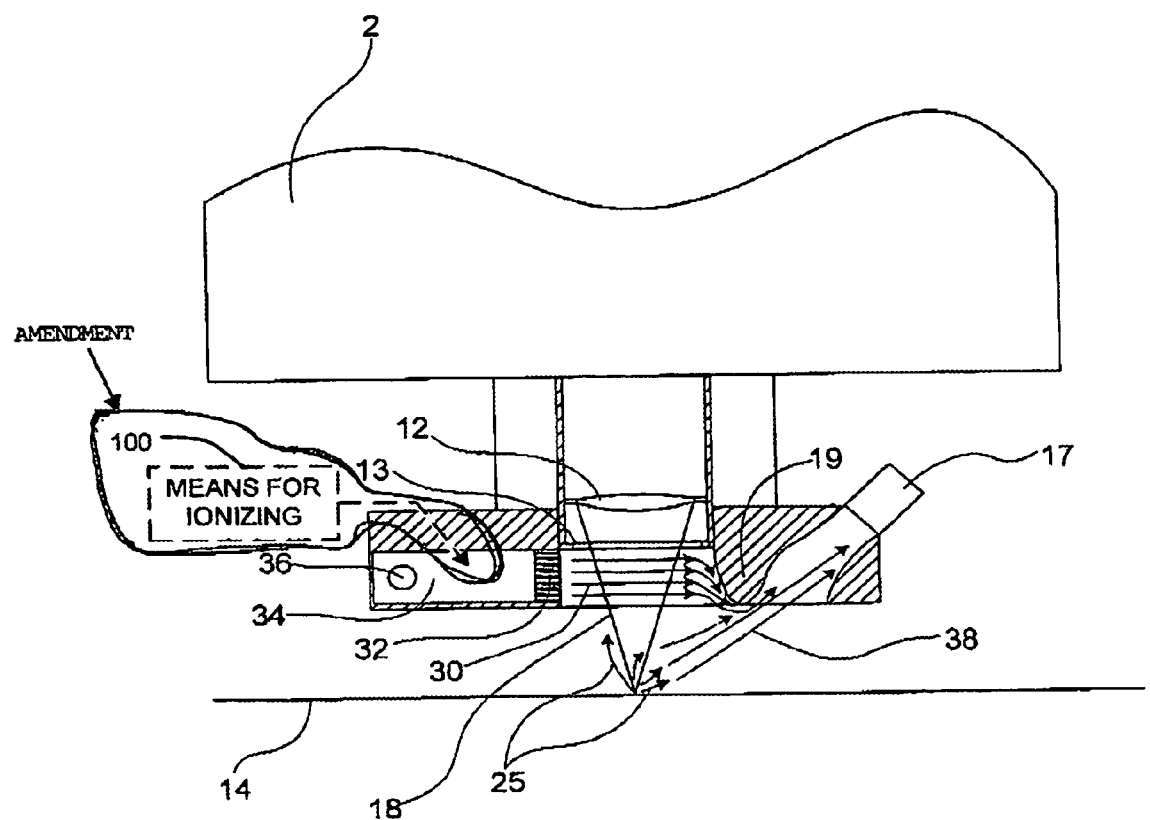
FIG. 2-A

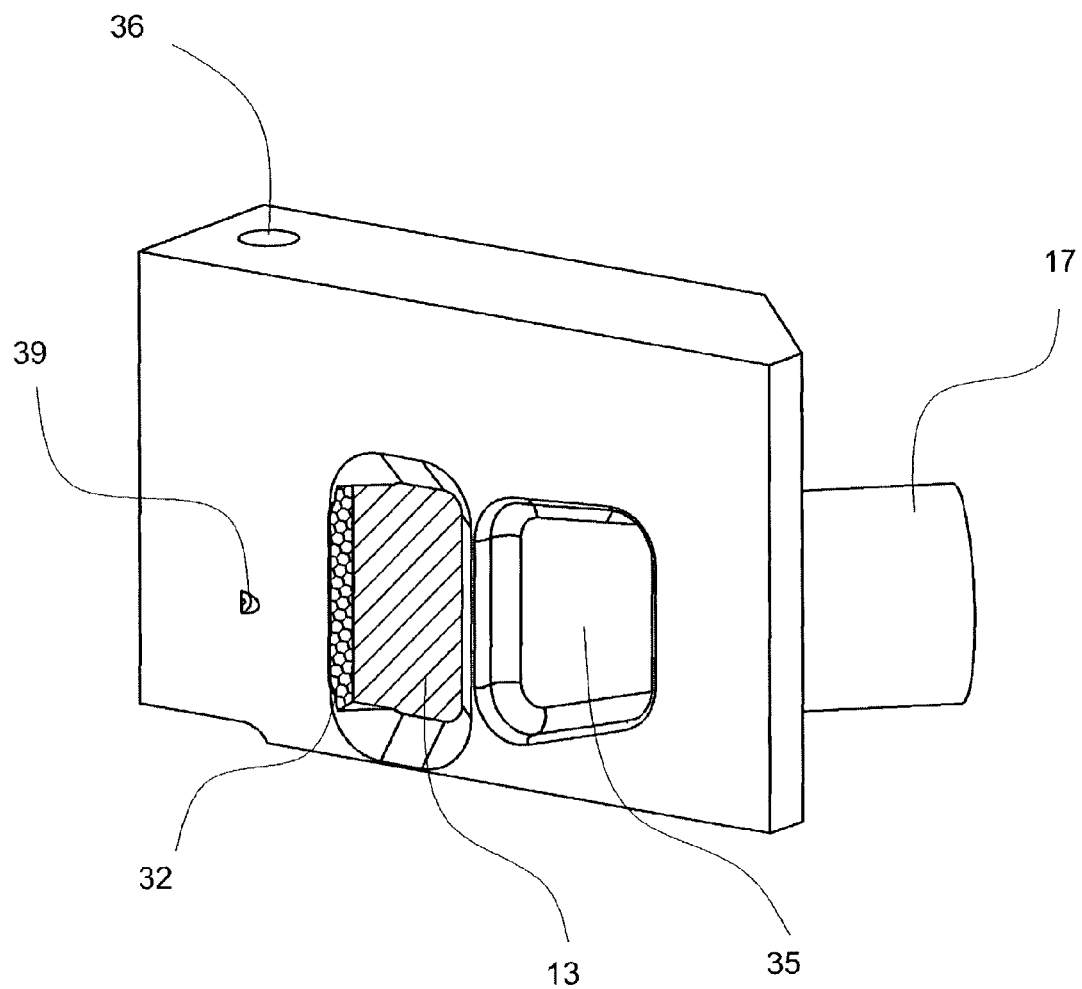
FIG. 2-B

METHOD AND APPARATUS FOR PREVENTING DEBRIS CONTAMINATION OF OPTICAL ELEMENTS USED FOR IMAGING

FIELD OF THE INVENTION

This invention relates to the field of applying images to imaging media. Specifically, the invention relates to methods and apparatus for preventing the build-up of debris on optical components in imaging systems.

BACKGROUND OF THE INVENTION

Laser imaging is well known. In a typical laser imaging process a laser-sensitive media is mounted onto the surface of an imaging cylinder and an image is imparted onto the media using a focussed write laser. FIG. 1 shows a prior art external drum imaging system 1 having an imaging head 2 directing a laser beam or beams 18 towards a media 4. The media 4 is rotated on a drum 5 while the imaging head 2 is translated along the drum by a lead screw 6, thus scanning or writing a series of bands or a helical pattern around the drum.

Alternatively, the scanning motion can be generated using a flatbed imaging system where the media is held on a platen and relative motion is generated in two orthogonal axes between the media surface and the imaging beam. The imaging systems described are used in dedicated devices for imaging many different kinds of media including lithographic plates, flexographic plates, screens for screen printing, gravure cylinders as well as layers for flat panel displays, printed circuit boards and the like. Furthermore, the imaging system could be incorporated directly on a printing press for imaging plates in situ. Since such systems are well known in the art they will not be further discussed herein.

During imaging, the interaction of the laser and the media causes a physical and/or chemical change to the imaged areas of the media. In the process of imaging, matter may be expelled from the laser sensitive media. The expulsion of matter from the media is referred to as ablation. The matter expelled may include solids, liquids, gases, or plasma, or a combination thereof, more commonly referred to by the terms "smoke" or "particulate debris". Ablative media are imaged by selectively dislodging or evaporating material from a layer of the media to form an image. While ablative media by nature produce ablation debris, media traditionally regarded as non-ablative can also produce some smoke fumes and/or particle debris, particularly when imaged by high power lasers such debris can also be termed "ablation debris".

Ablation debris presents several difficulties, which may hamper the imaging process. A first problem is that the debris may obstruct the laser beam thus affecting the imaging of the media. Ablation debris can also resettle onto the media; this is known as redeposit. Redeposit is a particularly critical problem in imaging laser sensitive media, because redeposit can cause imaging artifacts that may be visible on the final product. Once redeposit has occurred it is difficult to remove without damaging the imaged media. A third problem associated with ablation debris is related to its tendency to accumulate in the sensitive areas of the imaging lasers and other areas of the imaging device. Accumulation of ablation debris can cause severe degradation and/or damage to the components in the imaging system, particularly the laser optics. For example, if a layer of debris collects on a lens, it may drastically affect the lens' optical performance. Furthermore, the danger of ablation debris is not limited to optical degradation, since some media have partially conductive material compositions. Ablation debris from such materials can cause failures in electrical and electronic systems if it is released into the machine environment during imaging.

The escapement and subsequent accumulation of debris over a long time represents a maintenance cost related to cleaning the affected components. The issue is particularly relevant to the problem of build-up on the optical surfaces, since these components are delicate and difficult to clean and may require the dispatch of a specially trained service person to perform maintenance. Furthermore, as customers become increasingly demanding in respect of image quality, the tolerance for even slight degradation due to ablation debris on the optical elements is substantially reduced. If the time between cleaning of the optical components can be extended this represents a significant reduction in downtime and maintenance cost for the imaging system.

There is a need for better methods and apparatus for reducing the accumulation of ablation debris on optical elements in imaging devices.

SUMMARY OF THE INVENTION

An apparatus for maintaining the cleanliness of an optical element used in imaging a laser beam onto a sensitive media provides a substantially non-turbulent flow of fluid past the optical element. Fluid from a fluid source is channelled through a flow collimator that transforms a turbulent flow into a substantially non-turbulent flow. The non-turbulent flow is directed across the surface of the optical element, thus forming a barrier to debris accumulating on the optical surface. Advantageously, flow collimation is achieved by partitioning an orifice into a number of individual flow channels. Alternatively, the flow can be collimated by allowing it to flow along a straight passage, with optionally tapered walls.

BRIEF DESCRIPTION OF THE DRAWINGS

In drawings which illustrate non-limiting embodiments of the invention:

FIG. 2-A is a top view of an imaging head showing the path of debris in an imaging operation;

FIG. 2-B is a depiction of an embodiment of the present invention;

DETAILED DESCRIPTION

Figure 1:
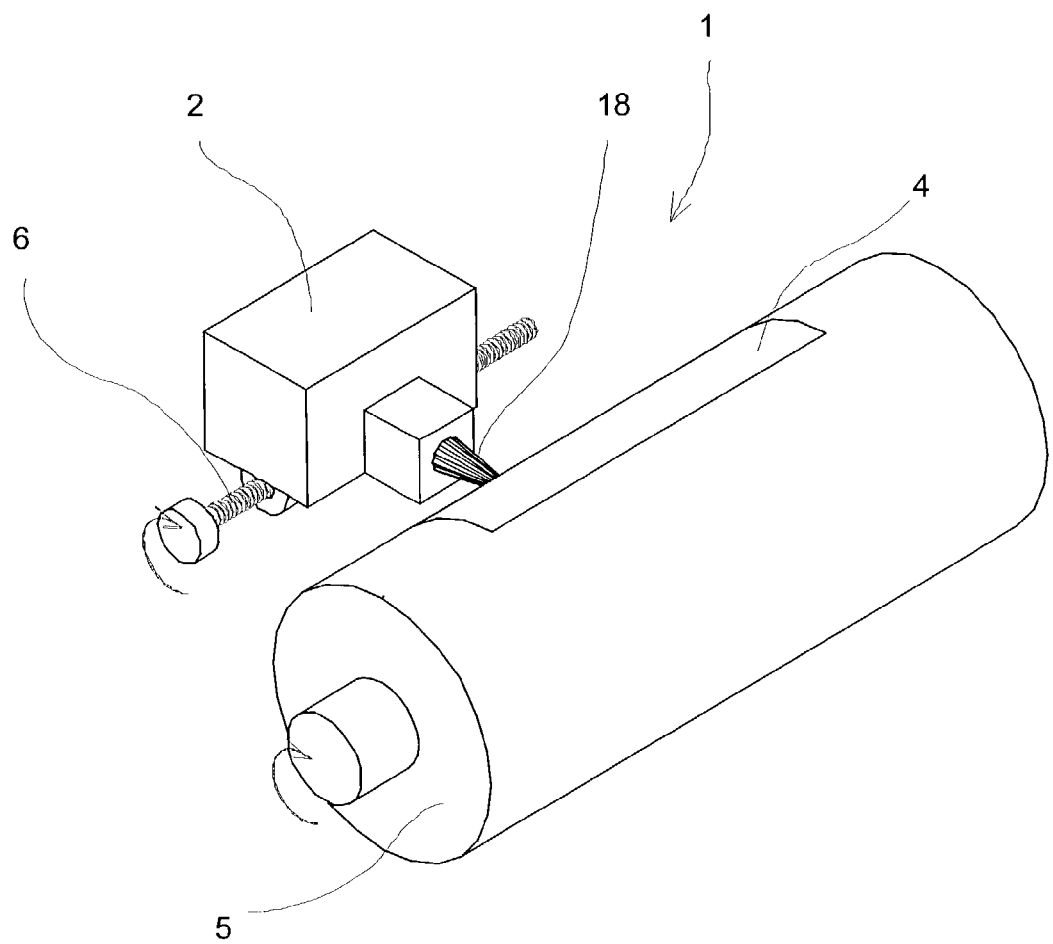
FIG. 1 is a depiction of a prior art external drum imaging system.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention is described in relation to an apparatus associated with an imaging head. The apparatus generates a substantially non-turbulent flow to form a barrier between an outermost optical element and the environment. The substantially non-turbulent flow is particularly effective since it will not draw debris particles toward the optical elements, as would a turbulent flow. The term "debris" or "imaging debris" is used herein to refer to gaseous and/or particulate matter generated in the imaging of a laser sensitive medium.

In a first embodiment shown in FIG. 2-A, an imaging head 2 has optical element 12 and window 13 through which an imaging beam 18 is directed at a media 14 producing imaging debris 25. The imaging beam 18, through its interaction with the media 14, creates debris 25. It is desired to prevent debris 25 from being deposited onto window 13. While it is common to use a laser source for producing the imaging beam, it is also possible to use non-laser sources in some instances. The way in which the imaging beam is generated is not important to this invention. Imaging head 2 is typically at least partially sealed due to the sensitive nature of the optical components therein. Commonly only a window 13 (which is itself an "optical element") is directly exposed to the outside environment. Alternatively if a window is not used a final optical element 12 may be exposed to the outside environment. It should be noted that the exposed optical element could be any one of a number of commonly known optical elements or combinations thereof, including but not limited to lenses, mirrors, prisms, windows or window domes and crystal elements. Regardless of the exact nature of the exposed optical element, it will be at least somewhat sensitive to contamination by debris.

The exposed optical element may be flat or may be curved. However, the curvature of the exposed optical element should not be too great. If the exposed optical element is too sharply curved then it will cause turbulence in the fluid flowing past it. As discussed below, turbulence is undesirable.

A fluid flow indicated by arrowed lines 30 is established in close proximity to the exposed optical element to form a barrier between debris 25 and the surface of the exposed optical element (in this case, window 13). The fluid most commonly used is air, supplied from either a blower or a clean pressurised air source such as a compressor or any other source of pressurised air. If factory air is used, a filter should be included to remove particulate and other contaminants commonly present in factory compressed air supplies. The fluid could also comprise a specialized fluid like clean nitrogen, a mixture of several gaseous fluids or any ionized gas.

A vacuum sink 17 is optionally provided. Vacuum sink 17 is generally operative to remove debris from the vicinity of the laser beam 18. Vacuum sink 17 is connected to a vacuum source (not shown). The sink functions to collect the debris 25 and will typically direct most of the debris in the direction of lines 38 towards the sink 17. Vacuum sink 17 is advantageously situated and oriented such that it draws the fluid flow in a similar direction to the flow 30. Vacuum sink 17 may also stabilize flow 30 and promote non-turbulent flow of the gas in flow 30.

In the illustrated embodiment, a smooth protrusion 19 is located between vacuum sink 17 and window 13. Fluid flow 30 is directed across window 13 toward protrusion 19. Fluid flow 30 flows around protrusion 19 to reach vacuum sink 17. Protrusion 19 is useful for maintaining flow 30 separate from the flow of gases which carry debris 25 from plate 14 toward vacuum sink 17.

Preferably, fluid flow 30 is generated such that it is substantially non-turbulent. Fluid flow 30 may be, but is not necessarily, laminar flow. A turbulent fluid flow will tend to mix with debris-contaminated fluid drawing in the particulate and fumes that may deposit on the window 13. In extreme cases where a turbulent flow is used the situation can actually be worse than if no flow at all is used, since particles that may not normally have deposited on window 13, may be gathered by the turbulent flow and deposited on window 13.

Referring now to FIG. 2B a flow-collimating element 32, connected to a fluid source 36, is used to promote a substantially non-turbulent flow across exposed optical element 13. In this embodiment the collimation (which may also be called laminarization) is achieved by partitioning the cross section of the flow orifice into a plurality of small passages, each extending in the direction of the fluid flow so that there is sufficient interaction of the passage with the fluid to make that portion of the flow substantially non-turbulent at the exit to the orifice. The flow contributions from the plurality of passages combine to form a substantially non-turbulent flow across the outer optical element.

A convenient way to provide a plurality of passages is to insert a length of miniature honeycomb material into the passage near the desired exit. The honeycomb comprises a plurality of hexagonal tubes fabricated as a single piece and is available commercially as a structural material used in the aircraft industry. The tubes extend through the material making it very suitable for use a flow-through element. Honeycomb material with cell sizes as small as 1/8" or even 1/32" is commercially available. The length of honeycomb required in the direction of the flow is related to the diameter of the cell. The interaction length is preferably on the order of 5 times the cell diameter or more. For example, a length of 6 diameters may be used—giving an interaction length of about 5 mm for the 1/32" cell size. The passages may be formed in any suitable manner including drilling, electro-forming, or laser machining.

In an alternative embodiment, also shown in FIG. 2-B, a fluid jet 39 is directed at or near the surface of media where the imaging beam impinges on the media. Jet 39 works in combination with the vacuum sink 17, and directs debris away from the imaging area towards the vacuum orifice 35. Although such a jet is effective in blowing away a significant portion of the debris it is not typically effective enough to keep an optical element clean for an extended period of time under normal imaging conditions. The non-turbulent flow across element 13 is still desired in order to extend the service time of the imaging system before the optics have to be replaced or cleaned.

Referring back to FIG. 2A, to promote minimum turbulence in the fluid flow 30 exiting the flow collimator 32, it is advantageous to distribute the flow evenly among the passages, such that there is a relatively constant fluid velocity at the point of recombination. One method of promoting even distribution of the fluid velocity among the collimator's passages is to incorporate a fluid reservoir or "plenum" 34 behind the flow collimator 32. A fluid reservoir is a chamber of fluid where the pressure within the chamber is relatively uniform. In this case, if the collimator's passages are of similar shape and length, the velocity of the fluid within the collimator's passages will be substantially the same.

Figure 3:
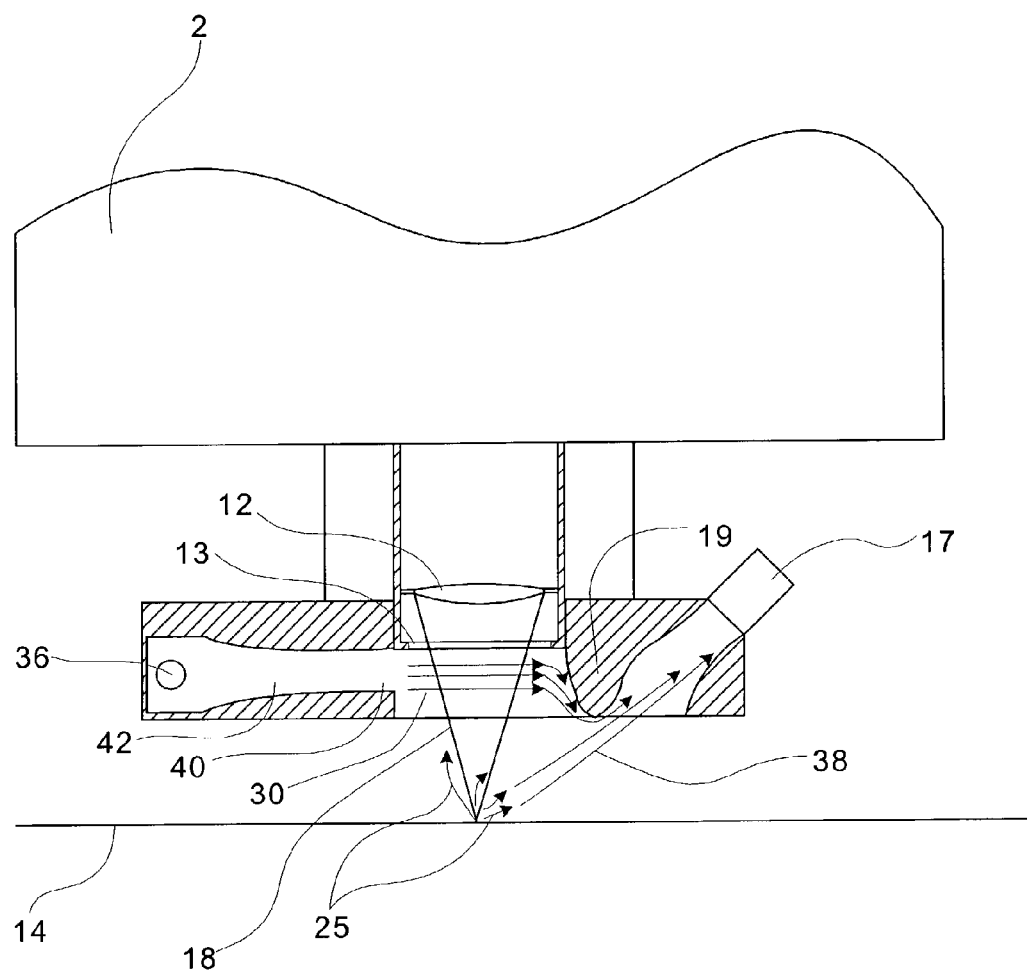
FIG. 3 is a depiction of an alternative embodiment of the present invention; and, FIG. 4 is a graph showing the results of a test performed using the present invention.

In an alternative embodiment shown in FIG. 3, an orifice 40 is fed via a long straight channel 42. The length of the channel 42 in the direction of fluid flow is typically somewhat greater than at least one of the dimensions of the orifice itself. For example, if the orifice is a wide slit of dimensions 1 unit by 30 units, then the length of the straight channel upstream of the orifice is at least somewhat greater than 1 unit. By straight, it is meant that for at least portion of the channel just upstream of the orifice, the main direction of the channel is relatively unchanged. The channel 42 can be gently tapered as shown in FIG. 3, either inwards or outwards as the fluid travels towards the orifice. The degree of acceptable taper is such that there is little increase in turbulence due to the introduction of the taper.

In the embodiments described above the introduction of the substantially non-turbulent flow across a sensitive optical element was found to have a significant effect.

EXAMPLE

Figure 4:
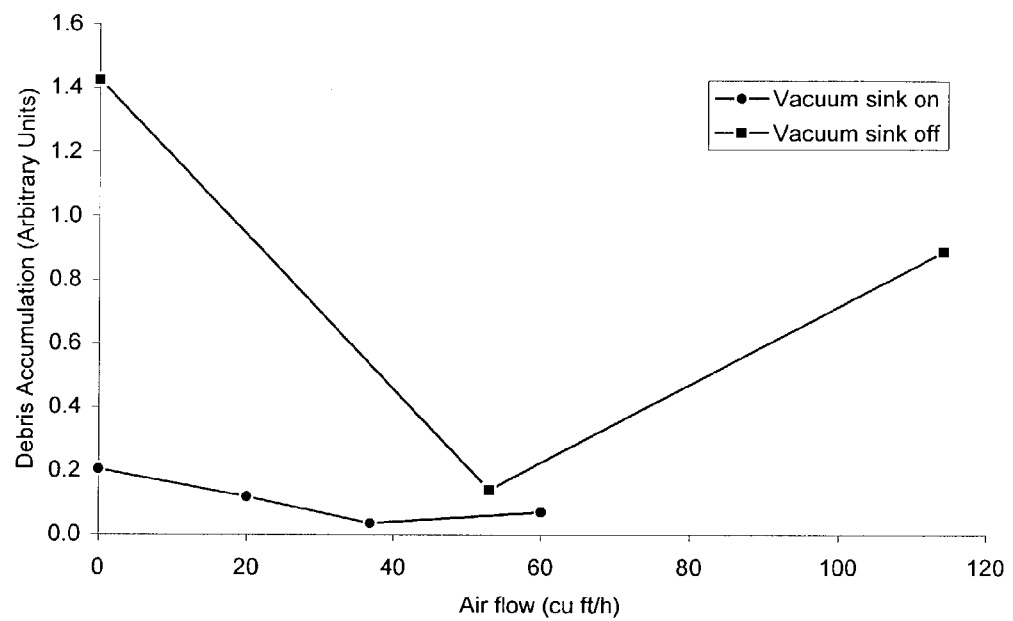

The apparatus shown in FIG. 2-B was installed on an imaging head manufactured by Creo Inc. of British Columbia, Canada. The imaging head has a 40W laser source and is able to image media at a high enough power density to generate ablation debris. The imaging head was mounted on a Trendsetter™ imaging engine manufactured by the same company and used to image ablative media while the flow rate was varied. The results are shown in the Graph of FIG. 4. The flow rate through the flow collimator is plotted on the x-axis while a measure of debris accumulation is plotted on the y-axis. The measure used for debris accumulation was to monitor the amount of light scattered from the window of the imaging head by directing an auxiliary laser beam onto the window and measuring the reflected light. When the window is clean, the light scattered is minimal, but as debris accumulates the scattered light increases in magnitude. The y-axis is plotted in arbitrary units while the units on the x-axis are cubic feet per hour (cu ft/h).

There are two plots on the Graph of FIG. 4, one with the vacuum sink turned on, and the other with the vacuum sink turned off. With the vacuum sink turned off, it can be seen that with no airflow the debris accumulation is relatively high while at a flow of between 40 and 60 cu ft/h the accumulation is substantially reduced. With the flow increased to over 100 cu ft/h, the debris accumulation is again increased. With the vacuum sink turned on the overall accumulations are substantially reduced, with a very low accumulation recorded at just under 40 cu ft/h.

In both cases, there is a distinct increase in debris accumulation when the flow rate is high. This is because the flow collimation works well at low and moderate flow rates but at high flow rates, turbulence is increased and particles are drawn into the flow and deposited on the window.

It should be understood that the above description is intended for illustrative purposes only, and is not intended to limit the scope of the present invention in any way. Those skilled in the art will appreciate that various modifications can be made to the embodiments discussed above without departing from the spirit of the present invention. For example, a means for ionizing the gas may optionally be provided in the fluid source and a shroud may optionally be provided around the exposed optical element. FIG. 2A shows schematically a means 100 for ionizing the gas. Additionally, the embodiments discussed above refer to a cylindrical imaging surface, but the invention should be understood to incorporate imaging processes on flat surfaces or other shapes of imaging surfaces.

What is claimed is:

1. An apparatus for preventing the contamination of an optical element in an imaging head for imaging a media that produces imaging debris, the apparatus comprising:

an imaging head comprising an exposed optical element and a source of an imaging beam directed through the optical element to image a media, the imaging beam creating imaging debris upon interaction with the media;

a pressurized fluid source;

an orifice for directing fluid from the fluid source across the front surface of the optical element;

a flow collimating element, interposed in a path of the fluid for producing a substantially non-turbulent fluid flow in front of the optical element;

a vacuum sink connected to a source of vacuum, the vacuum sink operative to remove the imaging debris from the imaging area in combination with the substantially non-turbulent fluid flow; and, a fluid jet directed towards the surface of the media, the jet for directing the imaging debris towards the vacuum sink.

2. The apparatus of claim 1 wherein the flow collimating element comprises plurality of parallel passages segmenting the orifice.

3. The apparatus of claim 2 wherein the parallel passages are hexagonal in cross section.

4. The apparatus of claim 2 wherein, in cross section, the parallel passages comprise an array of rectangular passages.

5. The apparatus of claim 4 wherein the parallel passages comprise a regular array of holes in the flow collimating element.

6. The apparatus of claim 1 wherein the flow collimating element comprises a substantially straight channel leading up to the orifice, the channel having a length in the direction of the fluid flow greater than at least one of the dimensions of the orifice.

7. The apparatus of claim 6 wherein the substantially straight channel is tapered.

8. The apparatus of claim 1 comprising a fluid reservoir for equalizing fluid pressure, the reservoir located before the flow collimating element, the reservoir fed by the fluid source.

9. The apparatus of claim 1 wherein the optical element comprises at least one of: a transparent window; and, an imaging lens.

10. The apparatus of claim 1 wherein the fluid source comprises a source of a gas.

11. The apparatus of claim 10 wherein the gas comprises air.

12. The apparatus of claim 10 wherein the gas is ionized.

13. The apparatus of claim 1 comprising a rounded protrusion located between the exposed optical element and the vacuum sink.

14. The apparatus of claim 1 wherein the vacuum sink comprises an inlet passage oriented generally in a direction of the substantially non-turbulent flow.

15. A method for preventing the contamination of an optical element in an imaging head for imaging a media that produces imaging debris, the method comprising:

collimating a flow of fluid from a source of pressurised fluid to produce a substantially non-turbulent fluid flow;

directing the non-turbulent fluid flow across an optical element such that the fluid flow forms a barrier between the optical element and the imaging debris;

vacuuming the imaging debris away from the imaging area using a vacuum sink; and, directing a fluid jet at the surface of the media to direct the imaging debris toward the vacuum sink.

* * * * *